(12) United States Patent
Buchstab (10) Patent No.: US 9,254,878 B2
(45) Date of Patent: Feb. 9, 2016

(54) MOBILE ROBOT

(71) Applicant: KUKA Roboter GmbH, Augsburg (DE)

(72) Inventor: Alois Buchstab, Stadtbergen (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 13/773,912

(22) Filed: Feb. 22, 2013

(65) Prior Publication Data

US 2013/0226340 A1    Aug. 29, 2013

(30) Foreign Application Priority Data

Feb. 23, 2012 (DE) .......................... 10 2012 003 690

(51) Int. Cl.
| | | |
|---|---|---|
| *B62D 57/00* | (2006.01) | |
| *B25J 5/00* | (2006.01) | |
| *B25J 5/04* | (2006.01) | |
| *B25J 9/02* | (2006.01) | |

(52) U.S. Cl.
CPC ................. *B62D 57/00* (2013.01); *B25J 5/007* (2013.01); *B25J 5/04* (2013.01); *B25J 9/026* (2013.01)

(58) Field of Classification Search
CPC .............................. B60B 19/003; B62D 57/00
USPC .............................. 180/6.2, 7.1, 7.2; 301/5.23
See application file for complete search history.

(56) References Cited

U.S. PATENT DOCUMENTS

| | | | | |
|---|---|---|---|---|
| 4,621,562 A * | 11/1986 | Carr | ......................... | B25J 5/007 180/22 |
| 5,018,923 A * | 5/1991 | Melan | ................... | F27D 1/1621 182/128 |
| 5,323,867 A * | 6/1994 | Griffin et al. | ................... | 180/22 |
| 5,358,568 A | 10/1994 | Okano et al. | | |
| 5,743,705 A * | 4/1998 | Eissfeller | ................. | B23Q 1/48 414/749.1 |
| 6,113,343 A * | 9/2000 | Goldenberg | ............. | B25J 5/005 239/587.2 |
| 6,481,372 B2 * | 11/2002 | van der Lely | ......... | A01J 5/0175 119/14.01 |
| 8,352,129 B2 * | 1/2013 | Yuan | ....................... | B66C 13/06 701/50 |
| 8,738,226 B2 * | 5/2014 | Troy et al. | ........................ | 701/36 |

(Continued)

FOREIGN PATENT DOCUMENTS

| | | | |
|---|---|---|---|
| DE | 10 2007 016 662 A1 | 10/2008 | |
| DE | 10 2008 002 274 A1 | 12/2009 | |

(Continued)

OTHER PUBLICATIONS

European Patent Office; Search Report in European Patent Application No. 13154899.2 dated May 27, 2014; 6 pages.

(Continued)

*Primary Examiner* — Joseph Rocca
*Assistant Examiner* — Marc A Scharich
(74) *Attorney, Agent, or Firm* — Wood, Herron & Evans, LLP (57) ABSTRACT

The invention relates to a mobile robot, exhibiting
  an omnidirectional wheeled support vehicle (1) having numerous omnidirectional wheels (13) and drives for driving the omnidirectional wheels (13),
  a robot arm (2), exhibiting numerous, successively disposed links (3-7) and drives for moving the links (3-7), and
  a positioning device (17), designed to position the robot arm (2), which can be automatically moved on the support vehicle (1), in relation to the support vehicle (1), and a drive dedicated to the positioning device (17) for moving the robot arm (2) in relation to the support vehicle (1).

3 Claims, 7 Drawing Sheets

(56) References Cited

U.S. PATENT DOCUMENTS

| | | | |
|---|---|---|---|
| 2004/0062630 A1* | 4/2004 | Marrero | F41A 9/87 |
| | | | 414/589 |
| 2007/0063500 A1 | 3/2007 | Eaton | |
| 2007/0140821 A1 | 6/2007 | Garon et al. | |
| 2008/0093131 A1* | 4/2008 | Couture et al. | 180/9.1 |
| 2010/0224427 A1 | 9/2010 | Nuchter et al. | |
| 2011/0174563 A1* | 7/2011 | Riesner | B25J 5/007 |
| | | | 180/117 |
| 2011/0214586 A1 | 9/2011 | Wessel et al. | |
| 2011/0238205 A1* | 9/2011 | Kemp | B66F 9/07581 |
| | | | 700/214 |
| 2011/0238217 A1* | 9/2011 | Kume et al. | 700/275 |
| 2011/0244125 A1* | 10/2011 | Weisenberg | B05D 7/22 |
| | | | 427/236 |
| 2012/0230668 A1* | 9/2012 | Vogt | 396/428 |

FOREIGN PATENT DOCUMENTS

| | | |
|---|---|---|
| DE | 10 2009 039 812 A1 | 3/2011 |
| DE | 10 2010 027 280 A1 | 1/2012 |
| EP | 2090506 A1 | 8/2009 |
| EP | 2292387 A1 | 3/2011 |

OTHER PUBLICATIONS

German Patent Office; Search Report in German Patent Application Na 10 2012 003 690.6 dated Oct. 12, 2012; 7 pages.

* cited by examiner

MOBILE ROBOT

The invention relates to a mobile robot, exhibiting an omnidirectional wheeled support vehicle having numerous omnidirectional wheels and drives for driving the omnidirectional wheels, as well as a robot arm exhibiting numerous successively disposed links, and drives for moving the links.

Robots are work machines that can be equipped for the automated manipulation and/or processing of objects with tools, and can be programmed in numerous movement axes, for example, with respect to orientation, location and operation sequence. Robots normally exhibit a robot arm having numerous links connected by means of joints, and a programmable control (control device), which controls or regulates the movement sequences during operation. The links are moved via drives, in particular electric drives, which are controlled by the control device, in particular with respect to the movement axes.

US 2010/0224427 discloses a mobile robot, exhibiting an industrial robot and an omnidirectional support vehicle, onto which the industrial robot is attached. The omnidirectional support vehicle comprises omnidirectional wheels and drives for moving the omnidirectional wheels. The industrial robot comprises a robot arm having numerous, successively disposed links and a control computer for moving the robot arm.

The objective of the invention is to provide an improved mobile robot.

The objective of the invention shall be attained by means of a mobile robot, exhibiting an omnidirectional wheeled support vehicle having numerous omnidirectional wheels and drives for driving the omnidirectional wheels, a robot arm exhibiting numerous, successively disposed links and drives for moving the links, and a positioning device, which is designed to support the robot arm, which can be moved automatically on the support vehicle, in relation to the support vehicle, and a drive dedicated to the positioning device for moving the robot arm in relation to the support vehicle.

An omnidirectional, wheeled support vehicle having numerous omnidirectional wheels and drives for driving the omnidirectional wheels can, in particular, be understood to be a vehicle, which can move, in particular along straight paths, in arbitrary directions on a subsurface, i.e. driving plane, without the need for a steering movement by wheels that are mounted in a steerable manner. The omnidirectional wheels can, in particular, be rotatable exclusively at the wheel axes, but otherwise rigidly attached to the support vehicle. A desired direction of movement or a desired turning of the support vehicle can be obtained exclusively by means of a difference in rotational rates of the omnidirectional wheels. Omnidirectional wheels can therefore be, for example, Mecanum wheels.

The positioning device exhibits a drive, by means of which the robot arm attached to the positioning device can be actively moved. The positioning device therefore does not rigidly attach the robot arm to the support vehicle, but rather, enables an automated movement of the robot arm on the support vehicle, or in relation to the support vehicle, respectively.

The positioning device can be designed to move the robot arm in a vertical and/or horizontal plane. The positioning device can, for example, move the robot arm in a purely vertical plane, such that the entire robot arm can be raised and/or lowered with respect to the support vehicle. The positioning device can, however, also move the robot arm in a purely horizontal plane, such that the entire robot arm can be moved at a uniform elevation with respect to the support vehicle, from side to side, or back and forth, respectively. The positioning device can also be designed in certain embodiments to move the robot arm in superimposed vertical and horizontal planes. Thus, a linearly mobile positioning device can be designed or configured to move at an angle, skewed, and/or diagonally in space.

In one embodiment, the support vehicle can exhibit a vertically mobile positioning device, which is attached, in particular, to a vehicle base body of the support vehicle. A support base can be attached on the surface of the positioning device facing away from the vehicle base body, the elevation of which can be automatically adjusted via the positioning device. An additional, horizontally moving positioning device can be disposed on the support base.

The robot arm, with its frame, can be attached to the additional, horizontally moving positioning device, such that the robot arm can be raised and/or lowered by means of the vertically moving positioning device, and can be moved on a linear track in a horizontal plane by means of the additional, horizontally moving positioning device.

A drive is dedicated, in each case, to the vertically moving positioning device and the horizontally moving positioning device, which is connected, in particular, to a control device for the robot arm. By this means, the control device is able to adjust the two positioning devices and the robot arm, with its frame, vertically and/or horizontally, in an automated manner.

The positioning device can exhibit at least one longitudinal rail attached to the support vehicle, on which the robot arm is supported such that it can be moved in a linear manner.

In another embodiment a positioning device that can move vertically due to the longitudinal rail can be formed directly on the support vehicle. The vertically movable positioning device in this embodiment exhibits at least one longitudinal rail, rigidly connected to the support vehicle, on which a carriage is mounted, which can be adjusted with respect to its elevation, i.e. it can be displaced in a linear manner. The frame of the robot arm is attached to the carriage, such that with a raising and/or lowering of the carriage, the entire robot arm is raised or lowered, respectively. The carriage can be connected by means of recirculating chains to a counterweight. The positioning device can have an additional dedicated drive, by means of which the robot arm, or its frame, respectively, can be raised and/or lowered vertically along the longitudinal rail in an automated manner. This drive can also be, in particular, connected to the control device for the robot arm, such that it enables the control device to raise and/or lower the robot arm, i.e. its frame, in an automated manner. The positioning device implements, in this embodiment, therefore, a vertically oriented linear axis, with respect to which the robot arm can be moved in the vertical plane.

The mobile robot can, in general, exhibit a lifting device, which is designed to lift the support vehicle in such a manner that the omnidirectional wheels are at least mainly, or entirely relieved of the net weight of the mobile robot. Drives for moving the lifting device are dedicated to the lifting device thereby. The lifting device can, in particular, exhibit at least three, in particular four, automatically adjustable support legs and drives for raising and lowering the support legs.

The lifting device can, for example, exhibit four automatically adjustable support legs. In this case, a single dedicated support leg is assigned to each of the four omnidirectional wheels. Each support leg can have a drive for raising and lowering the support leg to which it is dedicated. Each support leg can, for example, exhibit a cantilever arm, which can either be rigidly connected to the support vehicle, or is mounted on the support vehicle such that it can be extended and retracted. In the retracted state, the cantilever arm no longer extends, or extends only to a very slight degree, beyond the outer surface of the support vehicle, such that the cantilever arm does not form an interfering contour when the support vehicle is moving. In a first embodiment, an elevation adjustment can be obtained in that the cantilever arm itself is mounted on the support vehicle such that it can be adjusted in terms of height. In another embodiment, the cantilever arms can be mounted on the support vehicle without a height adjustment at the ends on the support vehicle, and a height adjustment is obtained by raising and/or lowering a foot located on a free end of the cantilever arms.

A lift-control device for the lifting device can be configured to control the drives for the lifting device, in particular the drives for the support legs, in such a manner that the omnidirectional wheels are at least largely, or entirely relieved of the net weight of the mobile robot, and the support vehicle is oriented such that the frame of the robot arm assumes a predetermined orientation in space. In one embodiment, the predetermined orientation can, for example, be defined in terms of a precisely horizontal orientation of the support vehicle, in particular its planar transport platform, or in terms of a precisely vertical orientation of the positioning device. In general, the predetermined orientation can be defined in terms of three programmed spatial orientations of a basic reference coordinate system for the robot arm. The basic reference coordinate system can be defined, for example, in relation to the frame.

In all embodiments, the mobile robot can exhibit a housing, which can prevent, at least to a certain extent, persons located in the vicinity of the mobile robot from reaching into the interior of the mobile robot. The control device and the lifting device can be disposed in the interior of the housing.

In a specific embodiment of the invention, the mobile robot can exhibit:
- at least one omnidirectional wheeled support vehicle having numerous omnidirectional wheels and drives for driving the omnidirectional wheels,
- at least one additional omnidirectional wheeled support vehicle having numerous omnidirectional wheels and drives for driving the omnidirectional wheels, and
- one support bridge rigidly connecting the one support vehicle to the additional support vehicle, which supports the positioning device and/or the robot arm.

In an embodiment of this type, the mobile robot exhibits an omnidirectional wheeled support vehicle having numerous omnidirectional wheels and drives for driving the omnidirectional wheels. Furthermore, a mobile robot of this type exhibits an additional wheeled support vehicle having numerous omnidirectional wheels and drives for driving the omnidirectional wheels. For this, the one support vehicle is rigidly connected to the additional support vehicle by means of a support bridge. The support bridge can exhibit a first support column and a second support column. The first support column can be rigidly connected to the support vehicle, and the second support column can be rigidly connected to the additional support vehicle. The two vertical support columns can extend vertically upward from the support vehicles. The upper ends of the two support columns can be connected by a horizontally oriented support beam such that the two support vehicles are disposed at a fixed spacing to one another. By means of the two support vehicles, which hold the support bridge, the support bridge can be moved on a base, i.e. on a track system, or a driving subsurface.

The support bridge can exhibit a positioning device. The positioning device can, in this respect, be rigidly attached to the support bridge, or, respectively, on the support beam of the support bridge. The positioning device for the support bridge can be designed in the manner of one of the positioning devices as described in the context of the other embodiments of the invention. The horizontally mobile positioning device can exhibit at least one longitudinal rail rigidly connected to the support bridge, or rigidly connected to the support beam, respectively, on which a carriage is supported that can be adjusted at a uniform height, i.e. supported such that it can be displaced back and forth. The frame of the robot arm, for example, can be attached to the carriage, such that with a back and forth movement of the carriage, the entire robot arm is moved back and forth. An additional, not depicted in greater detail, drive is dedicated to the positioning device, by means of which the robot arm, or its frame, respectively, can be automatically moved back and forth along the longitudinal rail. This drive can also be connected to the control device for the robot arm, such that it enables the control device to move the robot arm, i.e. its frame, back and forth in an automated manner. The positioning device thus implements in this embodiment a robot transport system, with respect to which the robot arm can be moved in a horizontal plane.

In all embodiments, the positioning device can be designed to move the additional positioning device in a horizontal plane, in particular, in a linear manner. In all embodiments, the additional positioning device can, alternatively or additionally, be designed to move the robot arm in a vertical plane, in particular in a linear manner.

In a further developed embodiment, a positioning device can be attached to the support bridge, and an additional positioning device may be provided, which is supported such that it can be automatically moved on the positioning device, wherein the additional positioning device is designed to support the robot arm such that it can be automatically moved in relation to the positioning device. The additional positioning device can be moved automatically thereby on the positioning device, wherein the additional positioning device is designed to support the robot arm such that it can be automatically moved in relation to the positioning device. In a specific design, the direction of movement for the positioning device is perpendicular to the direction of movement for the positioning device. The positioning device is designed thereby to move the additional positioning device in a horizontal, linear direction, and the additional positioning is designed to move the robot arm in a vertical, linear direction. By means of the positioning device, the robot arm can therefore be moved back and forth in this embodiment, and by means of the positioning device, the robot arm can be raised and/or lowered. The positioning device and the positioning device, together with the support bridge in this embodiment therefore implement a biaxial robot transport system, with respect to which the robot arm can be moved in a horizontal plane and in a vertical plane.

In all embodiments, the mobile robot, or the one or two, or, respectively, numerous support vehicles, can exhibit at least one lithium-ion battery, which is configured to supply electric energy to the drives of the support vehicle, the robot arm, the positioning devices, the lifting device, the control device, the additional control device and/or the lift-control device. The lithium-ion battery can be mounted in a removable manner in or on the support vehicle, in particular, it can be attached thereto in a removable manner.

In summary, the mobile robot exhibits, accordingly, at least one support vehicle and at least one robot arm, which is attached to the support vehicle. It is therefore also possible to support two or more robot arms on a shared support vehicle. By means of the support vehicle, the at least one robot arm, as such, can therefore be moved through space. The support vehicle is supplied, e.g. by means of a battery, in particular a lithium-ion battery, with electric energy. The at least one support vehicle can exhibit a track guidance system. Track guidance systems are known in general to the person skilled in the art, and can, for example, comprise optical sensors, which are installed on the support vehicle, for example, and act together with markings on the travel surface of the support vehicle such that the longitudinal and/or lateral movements of the support vehicle can be controlled in an automated manner. In the case of two or more support vehicles, the support vehicles can be coupled in a control-technology manner, i.e. in addition to their mechanical coupling via a support bridge, the drives of the two or more support vehicles can be controlled in a synchronous manner by means of a shared control device, such that the two or more support vehicles can execute synchronous movements. A tool can be attached to the robot arm, in particular to the attachment device, or the flange of the robot arm, such that a workpiece can be processed in an automated manner by means of the robot arm. By means of the support vehicle, it is possible to move, in particular in an automated manner, the mobile robot according to the invention, to the workpiece for the processing thereof. It is provided, in particular, that the mobile robot moves automatically to a predetermined position in relation to the workpiece, stops there, and begins processing the workpiece. Preferably, the mobile robot stops at the predetermined position in a predetermined orientation. The workpiece can, for example, be a rotor blade of a wind turbine or a wing of an airplane.

If the at least one support vehicle has arrived at the predetermined location, in a predetermined orientation, then the at least one support vehicle can be lifted by means of the lifting device. The support vehicle or the support vehicles are then firmly parked on the travel surface or travel floor, and can no longer be moved from their location when the lifting device has been extended. The at least one robot arm can then execute its robot program, i.e. it can process the workpiece by means of the tool. If the workspace of the robot arm is insufficient for a desired processing of the workpiece, then the entire robot aim can be moved by means of the positioning device, in particular, it can be repositioned, by means of which it is possible to expand the workspace for the robot arm, without the need for moving the support vehicle. It is also possible to move two or more robot arms simultaneously by means of a shared positioning device. Two or more robot arms can each also be moved by means of separate, i.e. individually dedicated positioning devices. In this case, the two or more robot arms can be moved independently of one another on the support vehicle, without the need to move the support vehicle.

The robot arm, or the drive thereof, respectively, preferably designed as an electric drive, in particular as a regulated electric drive, can be controlled by means of the control device such that the robot arm automatically processes the workpiece, after it has been moved to said workpiece, by means of the tool. For this, by way of example, a suitable computer program is run on the control device, such that the control device can process the workpiece, e.g. based on the mathematical model stored in the control device. The mathematical model of the workpiece is created, for example, based on the CAD data assigned to the workpiece.

Because the support vehicle is able to move automatically, the control device for the robot arm can also be configured to control the drives for the support vehicle such that said vehicle executes a predetermined movement. It is also possible, however, that the mobile robot according to the invention exhibits an additional control device, which communicates with the control device, and is configured to control the drives of the support vehicle such that said vehicle executes a predetermined movement.

In order to increase the mobility of the mobile robot according to the invention, the wheels are designed as omnidirectional wheels. One example of an omnidirectional wheel is a Mecanum wheel. In this case, the support vehicle concerns an omnidirectional support vehicle, which can move freely in substantially all directions. Mecanum wheels are known in theory to the person skilled in the art. Said wheels comprise, e.g. two wheel disks, rigidly connected to one another, between which numerous rollers are supported, which are rotatable with respect to their longitudinal axes. The two wheel disks can be rotatably mounted with respect to their rotational axes, and by means of one of the drives for the support vehicle, be driven such that the two wheel disks rotate with respect to the rotational axis. The rollers are spaced preferably at a uniform distance to one another, and supported on the wheel disks in such a manner that their roller surfaces extend over the circumference of the wheel disks. Furthermore, the rollers are preferably supported on the wheel disks such that their longitudinal axes exhibit, for example, a 45° angle to the rotational axis.

One advantage of the support vehicle designed as an omnidirectional support vehicle is the increased flexibility of the mobile robot according to the invention. By means of the use of a mobile robot of this type, it is possible to bring the mobile robot to the workpiece, e.g. a rotor blade, in a targeted manner, without the need for transporting the workpiece, or the rotor blade, respectively, and placing it in a specific station. With the mobile robot according to the invention, the workpiece, or rotor blade, respectively, can be processed in stages, for example, at both the front and back surfaces of the rotor blade. In addition, one can cut the duty cycle in half by means of two mobile robots according to the invention, or take care of other processing steps thereby, respectively. It may even be the case that the mobile robot according to the invention is moved between different production halls. As a result of the maneuverability of the support vehicle having omnidirectional wheels, it is possible to move the robot arm along the workpiece, or the rotor blade, respectively, and to supply the robot with the necessary energy, including the processing technology, at each station by means of, e.g. a docking system located in the floor. For this, no steel, concrete or foundation work is necessary, which would be very expensive and limit the flexibility of the system.

Various embodiment examples of the invention are depicted in an exemplary manner in the attached schematic drawings. They show.

Figure 1:
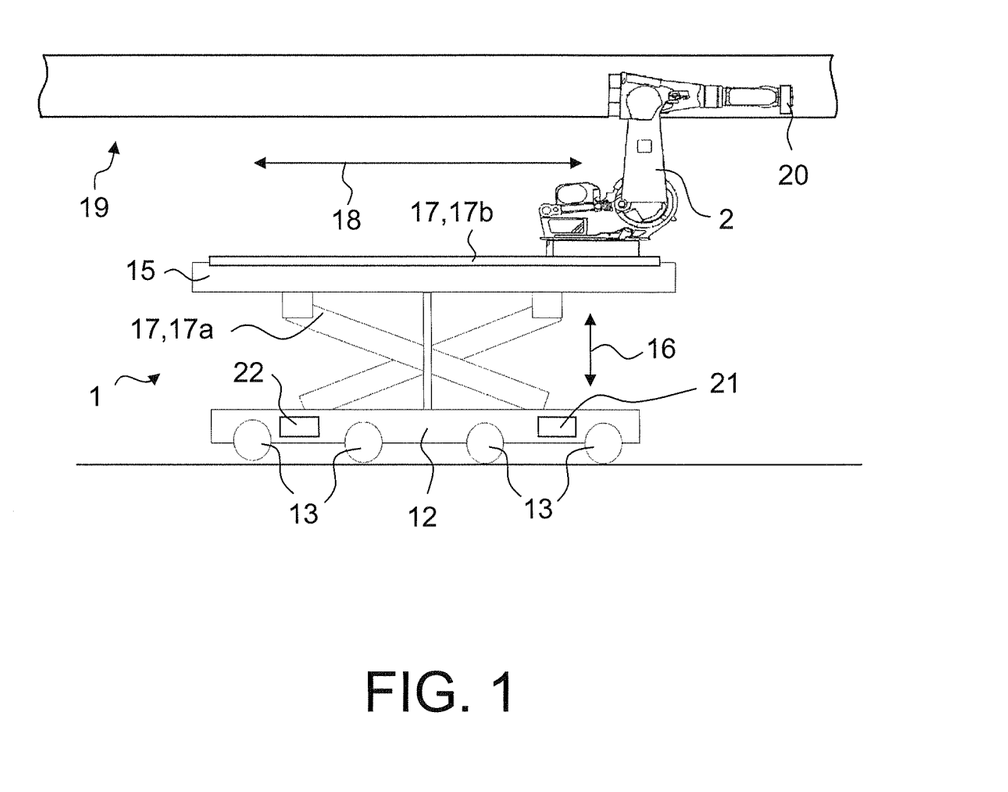
FIG. 1 a first embodiment of a mobile robot having a support vehicle exhibiting omnidirectional wheels and a robot arm on the support vehicle which can be moved by means of a positioning device, FIG. 2 the robot arm of the mobile robot, FIG. 3 an omnidirectional wheel, FIG. 4 a second embodiment of a mobile robot having a lifting device and the robot arm in an upper location, FIG. 5 the second embodiment of the mobile robot accordingly with the lifting device according to FIG. 4 and the robot arm in a lower location, FIG. 6 a third embodiment of a mobile robot having two support vehicles and a support bridge connecting said support vehicles, exhibiting a horizontally movable positioning device, and FIG. 7 a fourth embodiment of a mobile robot having two support vehicles and a support bridge connecting said support vehicles, exhibiting a horizontally movable and a vertically movable positioning device.
Figure 2:
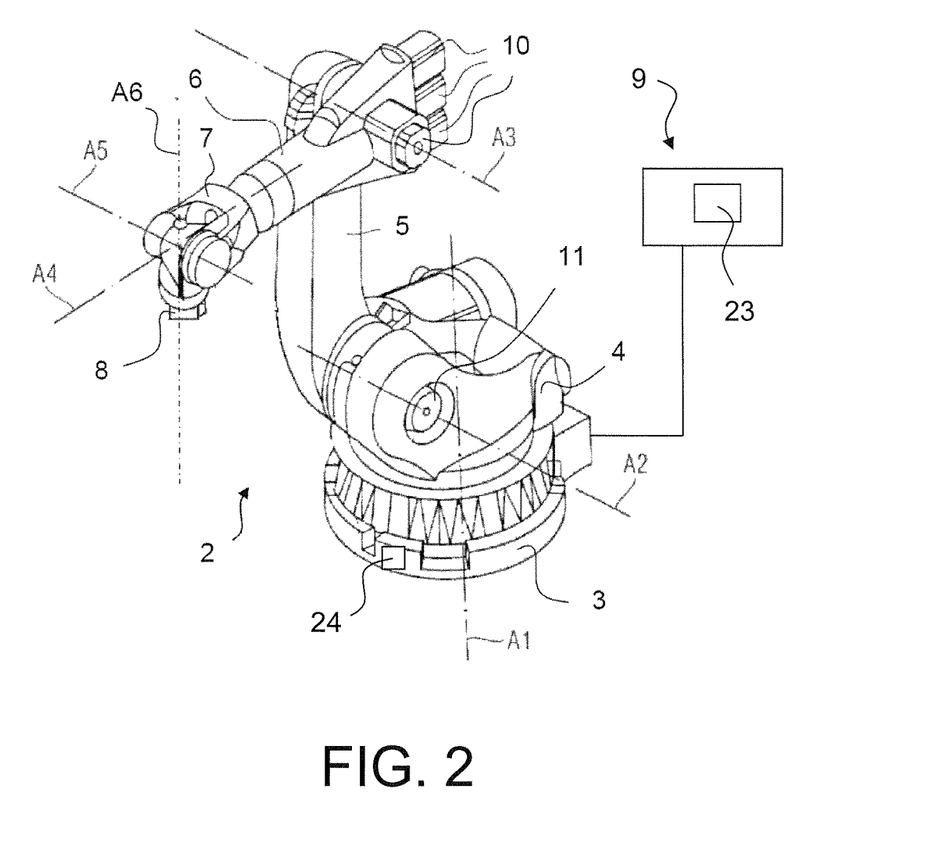

FIG. 1 shows a mobile robot exhibiting a support vehicle 1 and a robot arm 2 attached to the support vehicle 1. FIG. 2 shows a perspective depiction of the robot arm 2.

In the present embodiment example, the robot arm 2 comprises numerous, successively disposed links, connected by joints. The links concern, in particular, a frame 3 and a carousel 4, rotatably supported about an axis A1 running vertically in relation to the frame 3. Other links of the robot arm 2 in the case of the present embodiment example are a rocker arm 5, a cantilever arm 6 and a, preferably, multi-axial robot hand 7 having an attachment device executed as a flange 8 for attaching an end effector, not shown in greater detail. The rocker arm 5 is pivotally mounted about a preferably horizontal rotational axis A2 at the lower end, e.g. to a rocker bearing head, not shown in greater detail, on the carousel 4. The cantilever arm 6 is pivotally mounted in turn about a likewise preferably horizontal axis A3 at the upper end of the rocker arm 5. This supports at its end the robot hand 7 with its preferably 3 axes of rotation A4, A5, A6.

In the case of the embodiment example according to FIG. 1, the mobile robot is designed as an autonomous mobile robot, such that the control device 21 of the support vehicle 1 controls the drives for the omnidirectional wheels 13 in such a manner that the mobile robot moves on a path or track which is, or can be, predetermined.

The mobile robot comprises a control device 9 for moving the robot arm 2. The control device is connected to drives of the robot arm 2. The drives are electric drives in the case of the present embodiment example, in particular, regulated electric drives. In FIG. 2, only a few of the electric motors 10, 11 of these drives are shown. The robot arm 2 and the control device 9 are constructed, in particular, as standard industrial robots, supported on the support vehicle 1 via the positioning device 17, which can be moved automatically in relation to the support vehicle 1.

The support vehicle 1, in the case of the embodiment example according to FIG. 1, exhibits a vehicle base body 12, on which numerous omnidirectional wheels 13 are rotatably disposed. At least one of the omnidirectional wheels 13, preferably all of the omnidirectional wheels 13, are, or will be driven with one or more drives. The drives, not shown in greater detail, are preferably electric drives, in particular, regulated electric drives, and are connected to the control device 21, disposed, for example, in or on the vehicle base body 12, which is configured to automatically move the support vehicle 1 by means of the appropriate control of the drives for the omnidirectional wheels 13. The control device 21 of the support vehicle 1 is, in particular, connected to the control device 8 for the robot arm 2, such that said control devices can communicate with one another. A shared control device for the drives of the omnidirectional wheels 13 and the robot arm 2, however, can also be provided.

One example of an omnidirectional wheel 13 is the so-called Mecanum wheel. A Mecanum wheel of this type is shown in a front view in FIG. 3.

Figure 3:
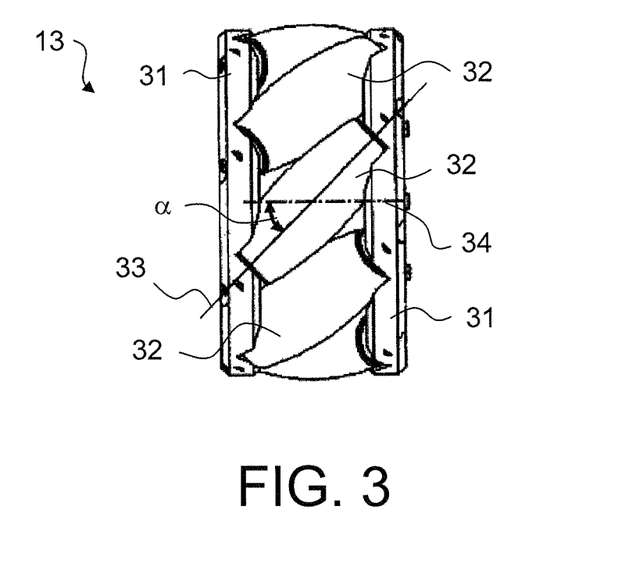

The omnidirectional wheel 13, designed as an omnidirectional, or Mecanum wheel, exhibits in the case of the present embodiment example, two wheel disks 31, rigidly connected to one another, between which numerous rollers 32 are rotatably supported in relation to their longitudinal axes 33. The two wheel disks 31 can be rotatably supported in relation to a rotational axis 34, and by means of one of the drives of the support vehicle 1, be driven such that the two wheel disks 31 rotate in relation to the rotational axis 34.

In the case of the present embodiment example, the rollers 32 are uniformly spaced in relation to one another, and supported on the wheel disks 31 such that their rolling surfaces extend over the circumference of the wheel disks 31. Furthermore, the rollers 32 are supported on the wheel disks 31 such that their longitudinal axes 33 exhibit an angle to the rotational axis 34 of, for example, 45°.

In the case of the embodiment example according to FIG. 1, the support vehicle 1 comprises a vertically moving positioning device 17a, which is, in particular, attached to the vehicle base body 12. On the surface of the positioning device 17a facing away from the vehicle base body 12, a support base 15 is attached, the elevation of which can be automatically adjusted by means of the positioning device 17a. An additional, horizontally moving positioning device 17b, is disposed on the support base 15. The robot atm 2, with its frame 3, is attached to the additional, horizontally moving positioning device 17b, such that the robot arm can be raised and/or lowered by means of the vertically moving positioning device 17a, and can be moved along a linear track in a horizontal plane by means of the additional, horizontally moving positioning device 17b.

In each case, a drive, not shown in greater detail, is dedicated to the vertically moving positioning device 17a and the horizontally moving positioning device 17b, which is connected, in particular, to the control device 9 for the robot arm 2. In this manner, it is possible for the control device 9 to move the two positioning devices 17a, 17b, and thus the robot arm 2, i.e. its frame 3, vertically, in the direction of the double arrow 16, and/or horizontally, in the direction of the double arrow 18, in an automated manner.

Figure 4:
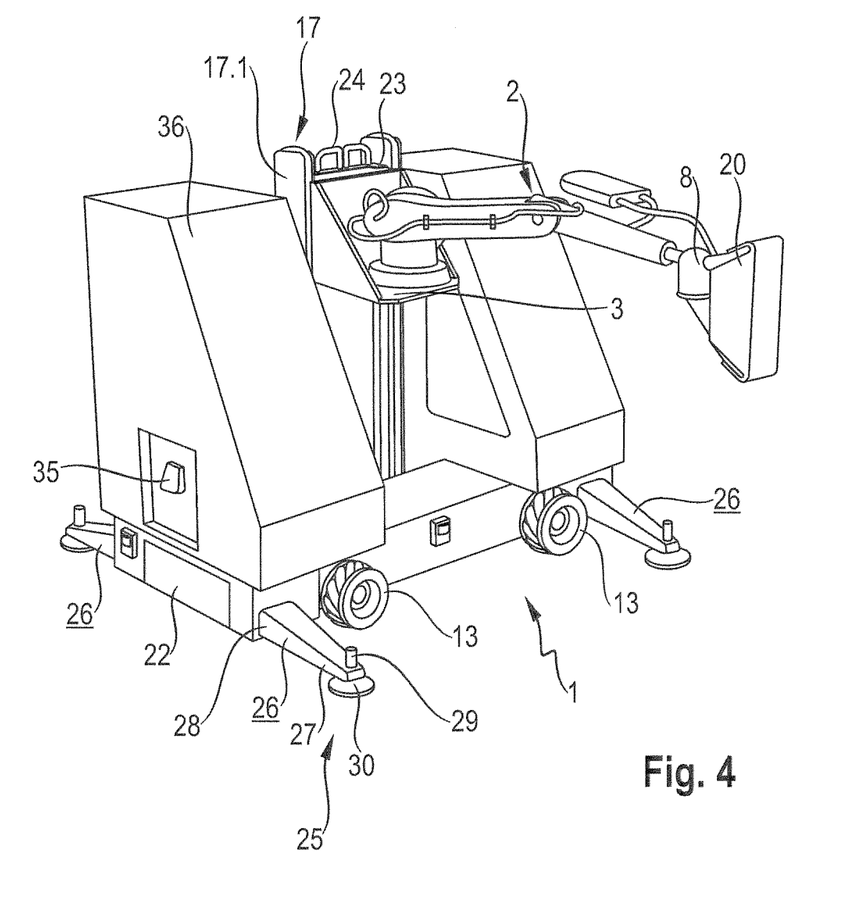

In the case of the embodiment example according to FIG. 4, a vertically mobile positioning device 17 is formed directly on the support vehicle 1. The vertically mobile positioning device 17 exhibits at least one longitudinal rail 17.1, rigidly connected to the support vehicle 1, on which a carriage 23 is supported, which can be moved in terms of its elevation, i.e. it can be displaced in a linear manner. The frame 3 of the robot arm 2 is attached to the carriage 23, such that with a lifting and/or lowering of the carriage 23, the entire robot arm 2 is raised and/or lowered. The carriage 23 can, as is shown in the depicted embodiment example, be connected via recirculating chains 24, to a counterweight, not shown in greater detail. An additional drive, not shown in greater detail, is dedicated to the positioning device 17, by means of which the robot arm 2, or its frame 3 can be automatically raised and/or lowered in the vertical plane along the longitudinal rail 17.1. This drive is connected, in particular, to the control device 9 for the robot arm 2, such that it enables the control device 8 to automatically raise and/or lower the robot arm 2, i.e. its frame 3. The positioning device 17 implements in this embodiment, therefore, a vertically oriented linear axis, in relation to which the robot arm 2 can be moved in the vertical plane.

The mobile robot according to FIG. 4 also exhibits a lifting device 25, which is designed to lift the support vehicle 1 in such a manner that the four omnidirectional wheels 13 in the present embodiment example, are relieved, at least for the most part, or entirely, of the net weight of the mobile robot. In the embodiment example according to FIG. 4, the lifting device 25 exhibits four automatically adjustable support legs 26. For this, one dedicated support let 26 is assigned to each omnidirectional wheel 13. A drive for lifting and lowering the support leg 26 is dedicated to each support leg 26. Each support leg 26 can, for example, exhibit a cantilever arm 27, which can be either rigidly connected to the support vehicle 1, or it is mounted on the support vehicle such that it can be extended and retracted. In the retracted state, the cantilever arm 27 would no longer, or in any case, only to a slight degree, extend beyond the outer contour of the support vehicle 1. In a first design, an elevation adjustment can be obtained in that the cantilever arm 27 itself is mounted on the support vehicle 1 such that it can be adjusted in terms of elevation. In another design, the cantilever arm 27 can be mounted on the support vehicle 1 without an elevation adjustment with its ends 28 at the support vehicle, and an elevation adjustment can be obtained by means of raising and/or lowering a foot supported on a free end 29 of the cantilever arm 27.

The lifting device 26 exhibits drives, not shown in greater detail, for moving the lifting device. A dedicated drive for raising and lowering can be assigned to each support leg 26.

The mobile robot in the embodiment example according to FIG. 4 exhibits a lift-control device 35, which is configured to control the drives for the lifting device 25, in particular the drives for the support legs 26, such that the omnidirectional wheels 13 are relieved of the net weight of the mobile robot, at least for the most part, or entirely, and the support vehicle 1 is oriented such that the frame 3 of the robot arm 2 assumes a predetermined orientation in space. In the depicted embodiment example, the predetermined orientation can be defined by a precisely horizontal orientation of the support vehicle 1, or, respectively, by a precisely vertical orientation of the positioning device 17. In general, the predetermined orientation can be defined by three programmed spatial orientations of a basic reference coordinate system for the robot arm 2. The basic reference coordinate system can, for example, be defined in relation to the frame 3.

In the case of the embodiment example according to FIG. 4, the mobile robot also comprises at least one rechargeable lithium-ion battery 22 as the electric energy supply. The lithium-ion battery 22 can be mounted, in particular, attached, on or in the support vehicle 1 such that it is removable.

Furthermore, the mobile robot according to FIG. 4 comprises a housing 36, which can, at least in part, prevent a person located in the vicinity of the mobile robot, from reaching into the interior of the mobile robot. The control devices 9, 21, and the lift-control device 35 can be disposed in the interior of the housing 36.

In the case of the present embodiment example, it is provided that the mobile robot automatically processes a workpiece 19. The workpiece 19 concerns, e.g. a rotor blade of a wind turbine, or a wing of an airplane. One processing step of the workpiece 19 carried out by means of the mobile robot is, e.g. a contour grinding and/or trimming of edges, the so-called trimming procedure, of the workpiece 19. In order to automatically execute said processing step, an appropriate tool 20 is attached to the attachment device of the robot arm 2 designed as a flange 8.

Figure 5:
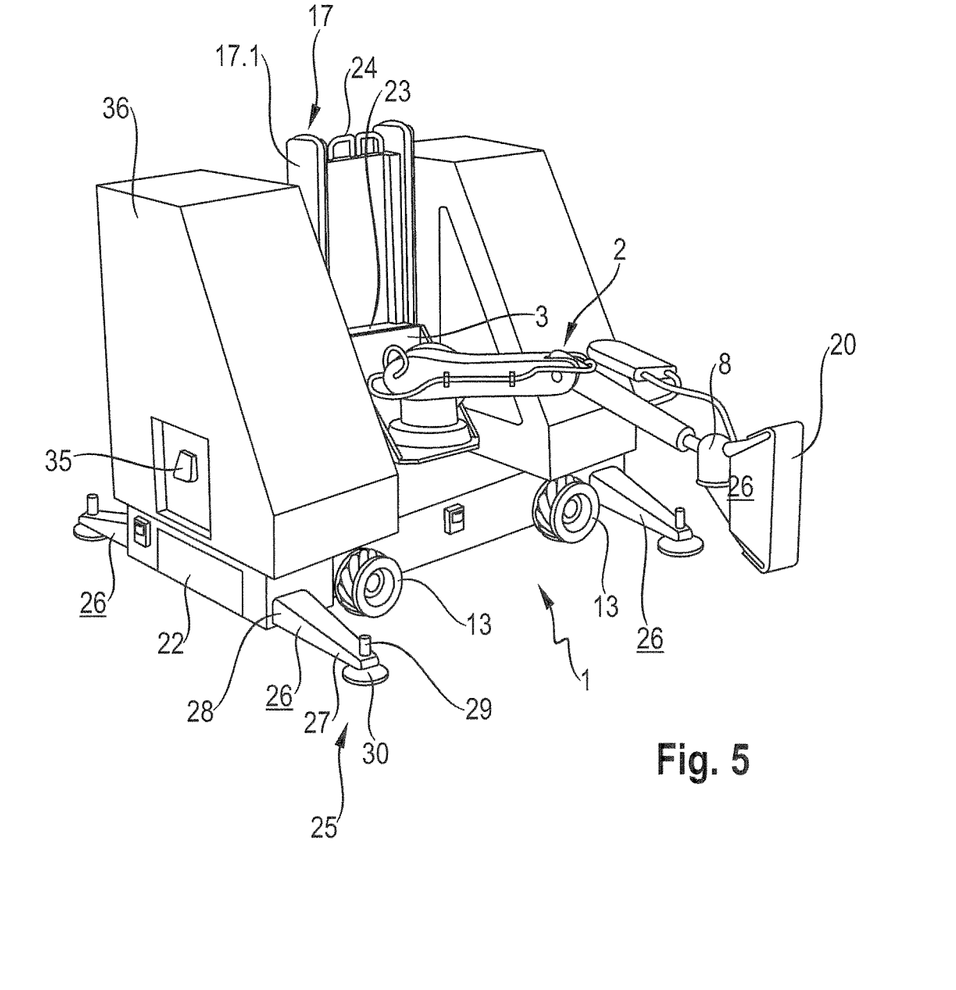

The entire robot arm 2 can be moved back and forth by means of the positioning device 17 between a lower location, as is shown in FIG. 4, and an upper location, as is shown in FIG. 5. The work range in which the tool 20 can be moved by the robot arm 2, in comparison to a rigid attachment of the robot arm 2 to the support vehicle 1, is enlarged by means of an elevation adjustability of the entire robot arm 2 of this type.

Figure 6:
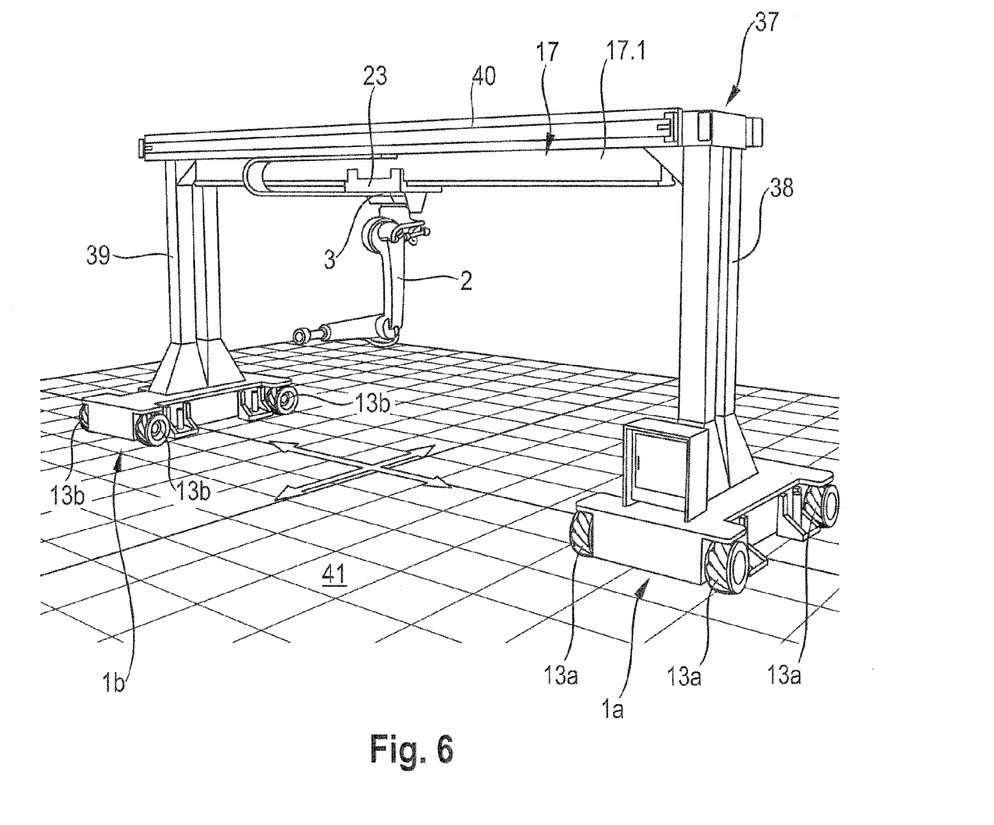

In the case of the embodiment example according to FIG. 6, the mobile robot exhibits an omnidirectional wheeled support vehicle 1a having numerous omnidirectional wheels 13a and drives for driving the omnidirectional wheels 13a. Furthermore, the mobile robot exhibits an additional omnidirectional wheeled support vehicle 1b having numerous omnidirectional wheels 13b and drives for driving the omnidirectional wheels 13b. For this, one support vehicle 1a is rigidly connected to the additional support vehicle 1b by means of a support bridge 37. The support bridge 27 exhibits, in the depicted embodiment example according to FIG. 6, a first support column 38, and a second support column 39. The first support column 38 is rigidly connected to the support vehicle 1a, and the second support column 39 is rigidly connected to the other support vehicle 1b. The two vertical support columns 38, 39 extend vertically upward from the support vehicles 1a, 1b. The upper ends of the two support columns 38, 39 are connected by means of a horizontally oriented support beam 40 such that the two support vehicles 1a, 1b are disposed at a fixed spacing to one another. The support bridge 37 can be moved on a base 41 by means of the two support vehicles 1a, 1b, which hold the support bridge 37.

The support bridge 37 in the embodiment example according to FIG. 6 exhibits a positioning device 17. The positioning device 17 is rigidly attached, in this respect, to the support bridge 37, or, respectively, on the support beam 40 of the support bridge 37. This horizontally mobile positioning device 17 exhibits at least one longitudinal rail 17.1, rigidly connected to the support bridge 37, or, respectively, rigidly connected to the support beam 40, on which a carriage 23 is supported such that its position can be adjusted at a uniform elevation, i.e. it is supported such that it can be displaced back and forth in a linear manner. The frame 3 of the robot arm 2 is attached to the carriage 23, such that with a back and forth movement of the carriage 23, the entire robot arm 2 is moved back and forth. An additional drive, not shown in greater detail, is dedicated to the positioning device 17, by means of which the robot arm 2, or its frame 3, can be automatically moved back and forth along the longitudinal rail 17.1. This drive is connected, in particular, to the control device 9 for the robot arm 2, such that it enables the control device 9 to automatically move the robot arm 2, i.e. its frame, back and forth. The positioning device 17 in this embodiment therefore implements a robot transport system, in relation to which the robot arm 2 can be moved in a horizontal plane.

Figure 7:
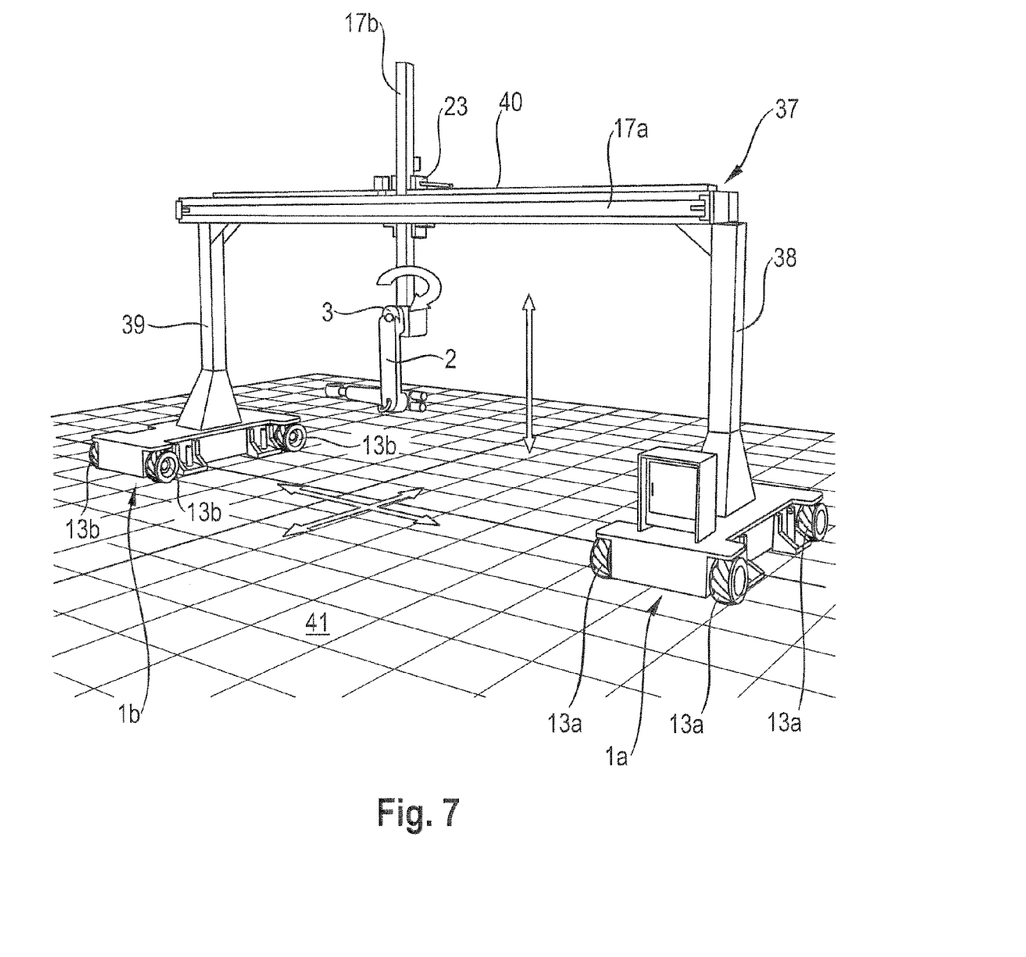

In the case of the embodiment example according to FIG. 7, in addition to the positioning device 17a, which can be designed in a manner analogous to the positioning device 17 according to FIG. 6, the mobile robot exhibits an additional positioning device 17b. The additional positioning device 17b is supported on the positioning device 17a such that it can be moved automatically on the positioning device 17a, wherein the additional positioning device 17b is designed to support the robot arm 2 such that it can be moved automatically in relation to the positioning device 17a. The direction of movement for the positioning device 17b is designed such that it is perpendicular to the direction of movement for the positioning device 17a. The positioning device 17a is designed thereby to move the additional positioning device 17b in a horizontal, linear plane, and the additional positioning device 17b is designed to move the robot arm 2 in a vertical linear plane. The robot arm 2 can therefore be moved back and forth by means of the positioning device 17a, and the robot arm 2 can be raised and/or lowered by means of the positioning device 17b. The positioning device 17a and the positioning device 17b, together with the support bridge 37, therefore implement in this embodiment a biaxial robot transport system, in relation to which the robot arm 2 can be moved in a horizontal plane and in a vertical plane.

The invention claimed is:

1. A mobile robot comprising:
an omnidirectional wheeled support vehicle having a plurality of driven omnidirectional wheels configured to move the support vehicle over a surface;
a robot arm assembly including a plurality of successively disposed links and controlled drives for moving the links, at least a portion of the robot arm assembly being rotatable about a vertical axis and at least one of the links being rotatable about a horizontal axis; and a positioning device supported on the support vehicle and configured to be controlled to automatically move the entire robot arm assembly in at least one or both of a vertical direction and a horizontal direction relative to the support vehicle, wherein the positioning device includes at least a vertically-movable device configured to be movable in the vertical direction and a horizontally-movable device configured to be movable in the horizontal direction, the horizontally-movable device including at least one horizontal rail supported on the vertically-movable device, and wherein the robot arm assembly is mounted on the at least one horizontal rail and is configured to move along the horizontal rail in at least the horizontal direction.

2. The mobile robot of claim 1, wherein the omnidirectional wheels are Mecanum wheels.

3. The mobile robot of claim 1 further comprising:

at least one lithium-ion battery configured to supply electric energy to the omnidirectional wheels of the support vehicle, the links of the robot arm assembly, the positioning device, or a combination thereof.

* * * * *